US 6,738,063 B2

(12) United States Patent
Shen et al.

(10) Patent No.: US 6,738,063 B2
(45) Date of Patent: May 18, 2004

(54) OBJECT-CORRESPONDENCE IDENTIFICATION WITHOUT FULL VOLUME REGISTRATION

(75) Inventors: Hong Shen, Plainsboro, NJ (US); Jianzhong Qian, Princeton Junction, NJ (US); Li Fan, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 82 days.

(21) Appl. No.: 10/071,003

(22) Filed: Feb. 7, 2002

(65) Prior Publication Data
US 2003/0146913 A1 Aug. 7, 2003

(51) Int. Cl.[7] .............................. G06T 17/00
(52) U.S. Cl. .................. 345/424; 345/420; 345/593; 345/594; 382/130; 382/154
(58) Field of Search ............... 345/419, 424, 345/420, 593, 594; 382/130, 131, 154; 600/419, 425

(56) References Cited

U.S. PATENT DOCUMENTS 5,647,360 A * 7/1997 Bani-Hashemi et al. .... 600/425
6,154,518 A    11/2000 Gupta ..................... 378/62
6,175,655 B1 * 1/2001 George et al. ............. 382/257

OTHER PUBLICATIONS

Mangin J.-F., et al. "Nonsupervised 3D Registration of PET and MRI Data Using Chamfer Matching," Conference Record of the 1992 IEEE Nuclear Science Symposium and Medical Imaging Conference, Orlando, FL, USA, Oct. 25–31, 1992, pp. 1262–1264, vol. 2, XP010108658.
Brown L.G.: "A Survey of Image Registration Techniques," ACM Computing Surveys, New York, NY, US, vol. 24, No. 4, Dec. 1, 1992 pp. 325–376, XP000561460.
International Search Report.

* cited by examiner

Primary Examiner—Mark Zimmerman
Assistant Examiner—Kimbinh T. Nguyen

(57) ABSTRACT

Disclosed is a method for object correspondence identification between two image sets, said method steps comprising roughly aligning the two image sets, receiving a selected point in said one image set, locating a rough matching point in said another image, defining a first volume-of-interest around said selected point, defining a search window around said matching point comprising a plurality of neighboring points, for every point in said search window, defining a second volume-of-interest, computing the similarity between each said second volume-of-interest with said first volume-of-interest, and selecting that second volume-of-interest that is most similar to said first volume-of-interest.

16 Claims, 3 Drawing Sheets

OBJECT-CORRESPONDENCE IDENTIFICATION WITHOUT FULL VOLUME REGISTRATION

FIELD OF THE INVENTION

This invention relates to the identification of object-correspondence between two image sets in general, and to lung nodule correspondence identification between medical image sets in particular.

BACKGROUND OF THE INVENTION

Lung CT technology has been widely used by physicians in the screening and diagnosis of lung cancer. From lung CT images, the physician can search for nodules and make judgements on their malignancy based on the statistics of the nodules, including shape, size, etc. A very important piece of information is the status change of the nodules, such as changes in shape, size, and density. One of the most significant quantitative measurements is the growth rate of lung nodules during a period of time. It is therefore crucial to identify the correspondence of the same nodule in two or more lung CT image sets captured at different time frames.

So far, this task has been done manually, and therefore it is tedious, slow, and error prone because of the tremendous amount of data. Because the CT data are 3D images, the task becomes very difficult for the physician, if at all achievable. In current clinical practice, the physician is required to scan through 2D slices of the 3D image data one by one and try to find the correspondence of a nodule in two image sets. The number of slices for a single data set is as large as several hundreds, and a single slice contains 250,000 pixels. Moreover, the imaging condition for the patient in the CT studies may be varied and the organ and the body may be deformed between two such studies. In many cases, it is difficult to determine if a nodule disappears after a period of time, or it still exists, because the physician is not able to identify the correspondence.

Fast registration of local volumes of interest (VOI) from large 3D image data is very often needed in medical image analysis systems, such as the systems for analyzing lung CT images. For example, in the screening and diagnosis of lung cancer, very important pieces of information are the presence of a new nodule, the absence of a previously presented nodule, and the growth rate of a lung nodule. It is therefore crucial to identify the correspondence of the same nodule in two or more lung CT image sets captured at different time frames. In most cases, the properties of the nodule and its surrounding structures are locally distinct, and therefore the registration of local VOI's is sufficient for identifying the correspondence of nodules.

The conventional algorithms for correspondence identification often use full volume registration/warping, which has severe shortcomings. First, the size of the data set is very large. A typical data set is 512×512×280, which makes full volume registration/warping out of the question if reasonable speed is required. Second, the poses of the patient and the lung volume controls during two image scans are always somewhat different, which causes non-linear distortions between the two result data sets. Therefore, to do an accurate full volume warping, non-linear techniques will be needed, which are complicated, difficult, slow, and unreliable.

What is needed is a system that avoids full volume registration, but performs fast and accurate registration of two local VOI's.

SUMMARY OF THE INVENTION

Disclosed is a method for object correspondence identification between two image sets, said method steps comprising receiving a selected point in said one image set, locating a rough matching point in said another image set, defining a first volume-of-interest around said selected point, defining a search window around said matching point comprising a plurality of neighboring points, for every point in said search window, defining a second volume-of-interest, computing the similarity between each said second volume-of-interest with said first volume-of-interest, and selecting that second volume-of-interest that is most similar to said first volume-of-interest.

In another aspect of the invention, said receiving of a selected point is effected through a graphical user interface.

Another aspect of the invention further comprises the step of roughly aligning the two image sets.

In another aspect of the invention, said rough alignment is effected through area and boundary matching.

In another aspect of the invention, said step of computing the similarity between said first and second volumes of interest comprises a grayscale cross correlation computation according to the equation $$S(V_A, V_B) = \frac{\sum (V_A(x,y,z) - \overline{V}_A)(V_B(x,y,z) - \overline{V}_B)}{\sqrt{\sum (V_A(x,y,z) - \overline{V}_A)^2} \sqrt{\sum (V_B(x,y,z) - \overline{V}_B)^2}}$$

where $\overline{V}_A$ and $\overline{V}_B$ are the mean of the grayscale values of all pixels in said two volumes-of-interest and the summations are over all the voxels in both said volumes-of-interest.

In another aspect of the invention, said step of computing the similarity between said first and second volumes of interest comprises computing the sum of absolute differences over all the voxels in said volumes-of-interest in accordance with the equation $$S(V_A, V_B) = \sum |V_A(x,y,z) - V_B(x,y,z)|$$

In another aspect of the invention, said step of computing the similarity between said first and second volumes of interest comprises thresholding followed by summation of inclusive OR:

$$I(x,y,z) = \begin{cases} 1, & V_A(x,y,z) \geq T, \quad V_B(x,y,z) \geq T \\ 1, & V_A(x,y,z) < T, \quad V_B(x,y,z) < T, \text{ and} \\ 0, & \text{else} \end{cases}$$

$$S(V_A, V_B) = \sum |I(x,y,z)|$$

where T is the threshold, and the summation is over all the voxels in both said volumes-of-interest.

In another aspect of the invention, said step of computing the similarity between said first and second volumes of interest comprises surface matching wherein the surface points of all objects within each volume-of-interest are defined as those points inside said volume-of-interest that have at least one immediate neighbor whose intensity is above a given threshold T and at least one immediate neighbor whose intensity is below T, and performing the steps of constructing a three-dimensional distance map for a first said volume-of-interest, $V_A$, $D_A(x,y,z)$ such that its value is the distance of the given point (x,y,z) to the closest surface point within $V_A$, and calculating the dissimilarity between said volumes-of-interest according to the equation $$ds = \sum_{(x,y,z) \in s_B} D_A(x, y, z).$$

where $s_B$ represents the complete set of surface points in said second volume-of-interest $V_B$. In case the two data sets are of different resolutions, the coordinates of $V_A$ and $V_B$ need to be normalized before the above equation can be applied.

Also disclosed is a program storage device readable by machine, tangibly embodying a program of instructions executable by the machine to perform the method steps set forth above.

DETAILED DESCRIPTION OF PREFERRED EMBODIMENTS

Figure 1:
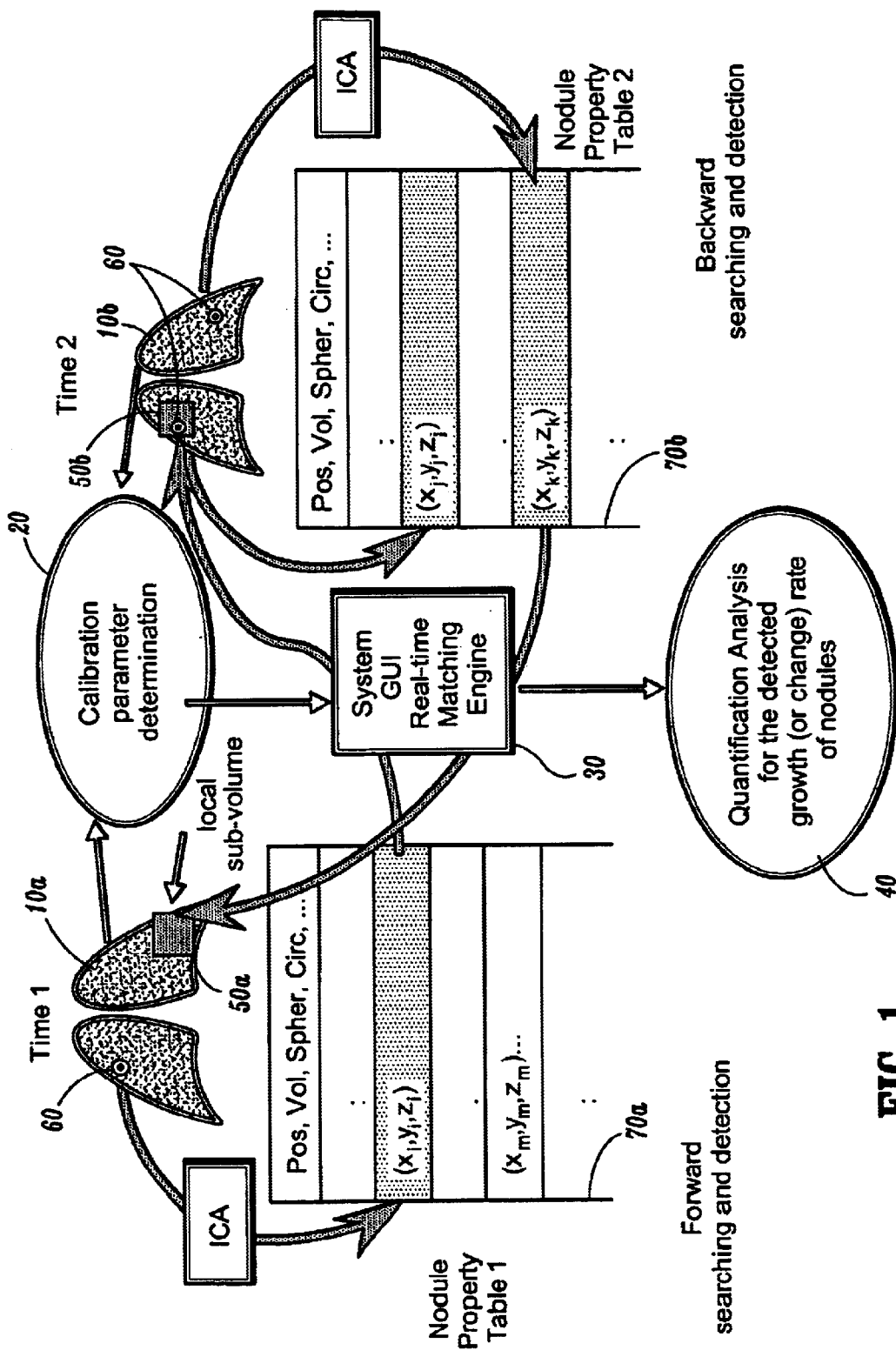
FIG. 1 shows a schematic representation of the invention.

Referring to FIG. 1 there is depicted a first 10a and second 10b datasets of the same lungs, taken at different times. These image data are three-dimensional, each comprising a plurality of voxels, each voxel located at a coordinate (x, y, z). After an initial calibration procedure 20 to roughly estimate the transformation between the coordinates of voxels in the two data sets (i.e., in effect, a mathematical "alignment" of the images), the system of the invention provides a graphical user interface (GUI) 30 that allows the user to browse through the volume data and select a volume-of-interest from one data set that includes an object of interest, such as a nodule 60. The information regarding the nodules 60 are provided to the user either through the online ICAD (Interactive Computer Aided Diagnosis and Detection) module such as is described in "Interactive Computer-Aided Diagnosis Method and System for Assisting Diagnosis of Lung Nodules in Digital Volumetric Medical Images" by Carol Novak, Li Fan, and JianZhong Qian, which is the subject of U.S. patent application Ser. No. 09/840,267, filed on Apr. 23, 2001, the disclosures of which are incorporated by reference herein in their entirety, or from previously constructed databases of objects, as listed in table 70a. A real-time matching procedure 30 is integrated with the GUI, which identifies the corresponding volumes of interest (VOI) in the other data set. If a nodule object is found in the corresponding VOI, the system has detected the object correspondence. The information of the corresponding nodule can then either be obtained through the online ICAD module, or read from the database, as listed in 70b. The information of the matched nodules is then analyzed 40 to deduce the growth and change of the nodules. The object correspondence matching can be done both ways between the two data sets, namely, from a previously scanned data set to a current data set, or the reverse.

Figure 2:
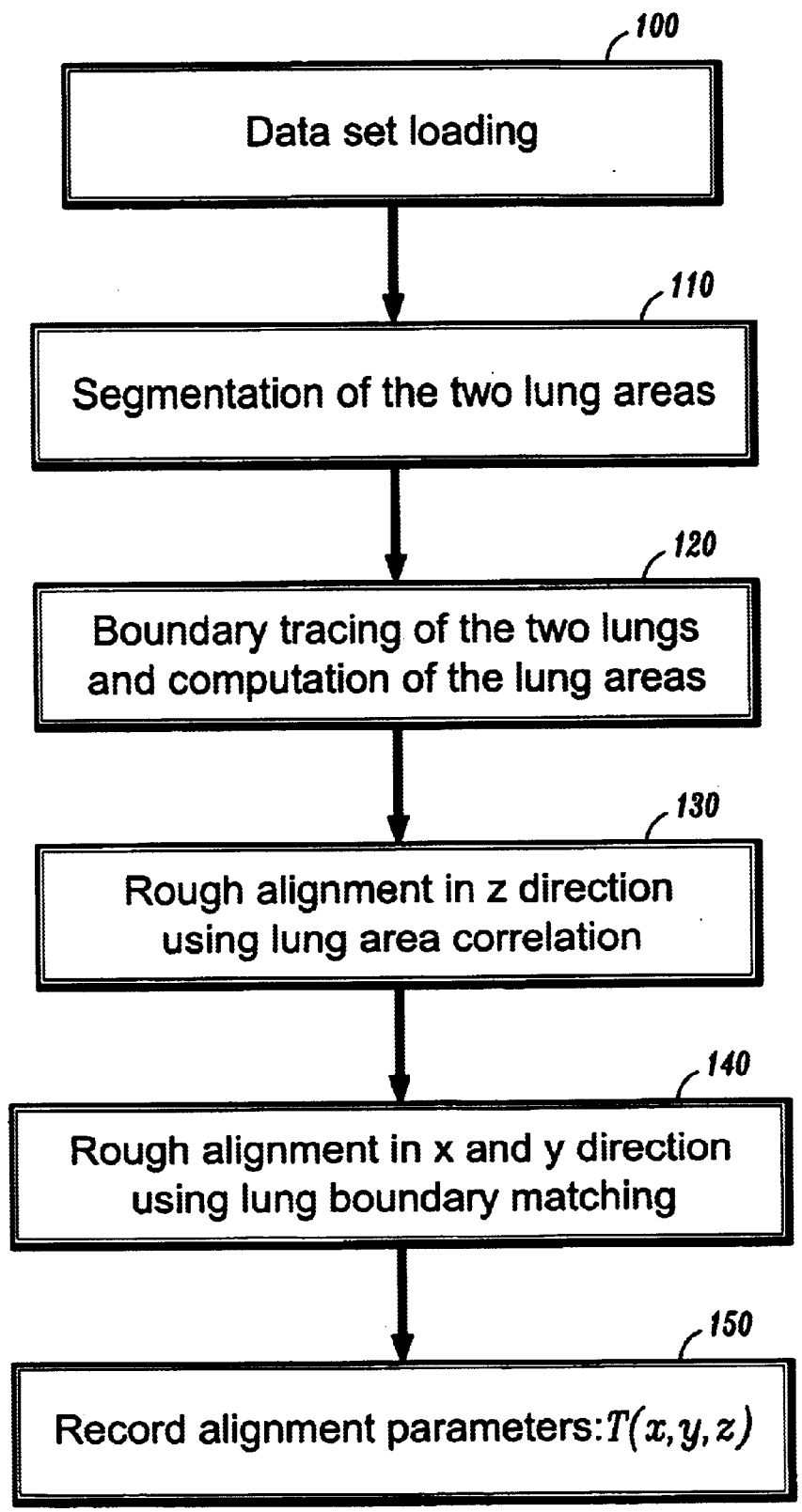
FIG. 2 is a flowchart of a calibration method of the invention.

Referring to FIG. 2, there is depicted a flowchart for aligning the two data sets during the calibration procedure 20. We assume that the local VOI's are much smaller than the whole volume of the image data set, and that the transformation between two data sets are piecewise linear. Therefore, in the local VOI's, linear transformation models are sufficient for accurate registration.

Rough alignment is performed when the data sets are loaded 100. It is able to handle cases even when the two data sets are of different resolutions. One possible way to do so could be, but not limited to, weighting the coordinates by the resolutions. The alignment parameters represent the linear transformations along three directions. These parameters could vary for different slices of images, and different areas of the images.

The alignments are based on the areas and boundaries of the two lungs. We assume that alignment parameters can be different for the two lung areas, namely the left and right lungs. In order to get the area and boundary information, the two lungs are segmented 110 from the image sets for each slice, mainly by techniques related to thresholds. Afterwards, the boundaries are obtained by boundary tracing 120.

The z-direction alignment 130 is performed as follows. The areas of two lungs in every slice are computed, and used to form arrays of area values, with indices being the z-coordinate values weighted by the resolution in z-direction. A cross correlation is performed on the two arrays from the two data sets. The peak correlation point gives the shift and the scaling in the z-direction. The alignment is robust because of the stability of the lung areas. By calculating the shift and scaling parameters in the z-direction, the slice (2D image) correspondences are determined.

Given two corresponding slices, the alignment in x- and y-directions 140 are achieved by matching of the boundaries of the lungs. The matching uses either binary correlation or techniques of Euclidean distance maps. The alignment parameters may then be stored 150 for use by the GUI and real-time matching procedure 30.

The alignment parameters are rough estimations of the transformations between the two image sets 10a, 10b and they can be different for the two lung areas and for different slices.

Figure 3:
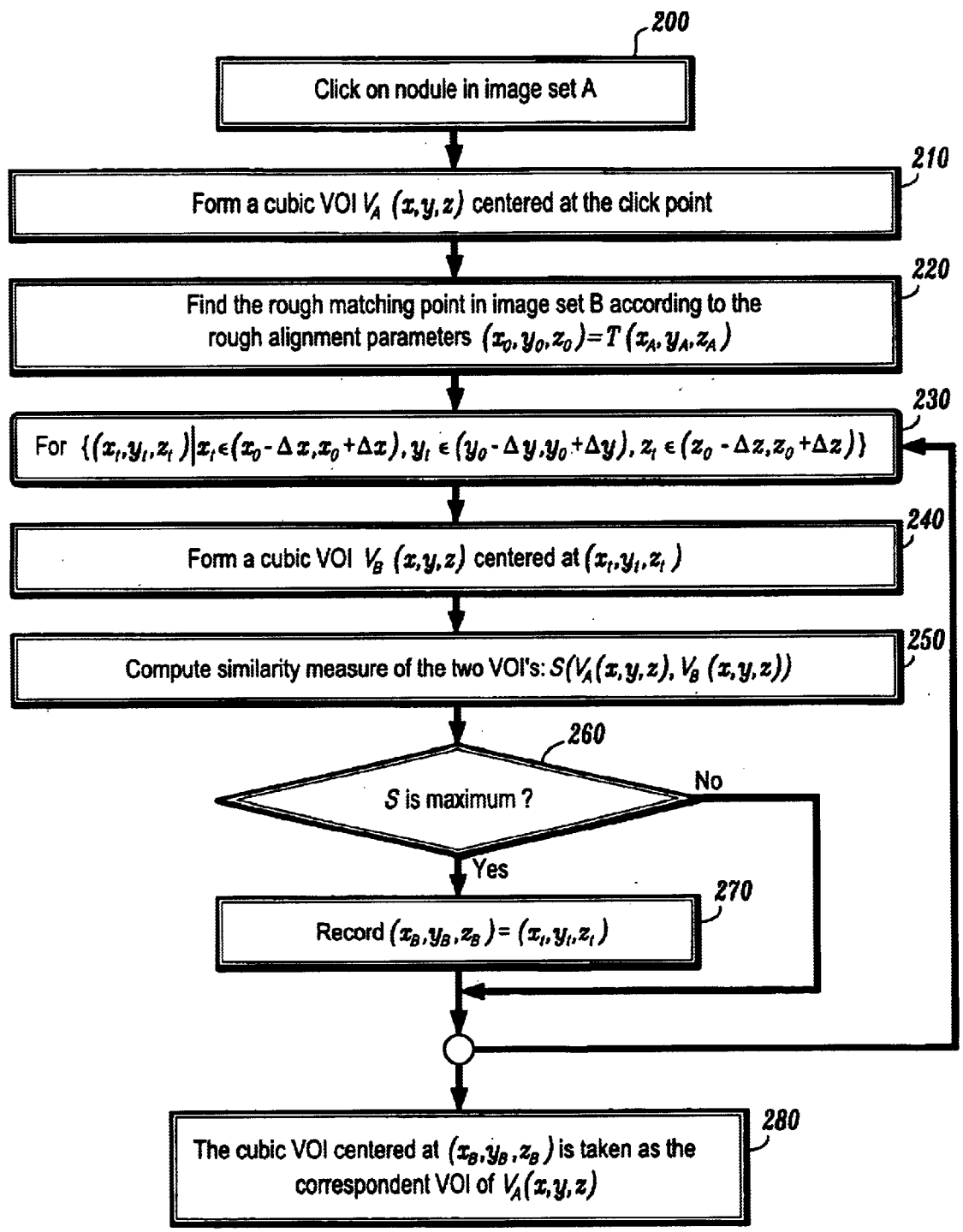
FIG. 3 is a flowchart of an embodiment of the method of the invention.

Referring to FIGS. 1 and 3, there is shown a flowchart of the real-time matching procedure of the invention. Processing begins with the user, through the GUI 30, "clicking" 200 on a nodule 60 he sees in the first image set 10a, though other GUI methods of identifying a nodule may be used other than mouse clicks, such as for example, a stylus- or touch-sensitive display. A VOI is then defined 210 about the click-point. For an x, y, z coordinate system, this will generally be a cubic volume $V_A(x, y, z)$ centered about the click point (x, y, z). Other shapes of VOI can also be used. When a VOI in one image set is defined by forming a sub-volume around the click point that is within an object of interest, the click point is transformed to the other image set 220 using the rough alignment parameters obtained in the pre-processing procedure. After that, we form a set of VOI's ($V_B$) whose center points are within a 3D search window centered at the transformed click point. We search 230 through these VOI's to find the most similar 260 to $V_A$, and it is taken 280 as the refined correspondent VOI $V_B$, and the object located at the center of that VOI ($x_B$, $y_B$, $z_B$) is taken 260 as the corresponding object of interest.

The performance of the correspondence matching largely depends on the search range, which is determined by the accuracy of the rough alignment. With a good rough alignment, the online correspondence matching achieves real-time performance.

There are various ways to compute 250 the similarity of two VOI's, four of which are as follows:

1. Grayscale cross-correlation:

$$S(V_A, V_B) = \frac{\sum (V_A(x, y, z) - \overline{V}_A)(V_B(x, y, z) - \overline{V}_B)}{\sqrt{\sum (V_A(x, y, z) - \overline{V}_A)^2} \sqrt{\sum (V_B(x, y, z) - \overline{V}_B)^2}}$$

where $\overline{V}_A$ and $\overline{V}_B$ are the mean of the grayscale values of all pixels in the two VOI's, respectively, and the summations are over all the voxels in the two VOI's.

2. Sum of absolute difference:

$$S(V_A, V_B) = \Sigma |V_A(x,y,z) - V_B(x,y,z)|$$

where the summation is over all the voxels in the two VOI's.

3. Thresholding followed by summation of inclusive OR:

$$I(x, y, z) = \begin{cases} 1, & V_A(x, y, z) \geq T, \quad V_B(x, y, z) \geq T \\ 1, & V_A(x, y, z) < T, \quad V_B(x, y, z) < T, \text{ and} \\ 0, & \text{else} \end{cases}$$

$$S(V_A, V_B) = \Sigma |I(x,y,z)|$$

where T is the threshold, and the summation is over all the voxels in the two VOI's.

4. Surface Matching.

This method searches for the VOI with the minimum dissimilarity. The surface points of all objects within a VOI are defined as those points inside the VOI that have at least one immediate neighbor whose intensity is above a given threshold T and at least one immediate neighbor whose intensity is below T.

Construct a 3D distance map for $V_A$, $D_A(x,y,z)$ such that its value is the distance of the given point to the closest surface point within $V_A$. Let $s_B$ represent the complete set of surface points in $V_B$, then the dissimilarity between $V_A$ and $V_B$ is defined as $$ds = \sum_{(x,y,z) \in s_B} D_A(x, y, z).$$

After the VOI's for the nodules have been matched, the changes in the nodules may be analyzed 40. As can be seen, by real-time extraction of corresponding volumes-of-interest (VOI's) between the images as the user clicks on a point of interest in one image, we can focus on each of these volumes locally without having to compute and register the full volume of both images. As stated before, full volume registration would require non-linear matching techniques, while the invention may utilize linear matching techniques because it performs its matches on a smaller local level, one user click at a time.

It should also be noted that the teachings of the invention are not limited to either nodules or lungs, nor even three-dimensional images, but rather may be utilized and generalized to any image processing situation wherein object-correspondence identification between two image sets is desired.

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for object correspondence identification between two image sets, comprising:

receiving a selected point in said one image set;

locating a rough matching point in said another image;

defining a first volume-of-interest around said selected point;

defining a search window around said matching point comprising a plurality of neighboring points;

for every point in said search window, defining a second volume-of-interest;

computing the similarity/dissimilarity between each said second volume-of-interest with said first volume-of-interest by applying a grayscale cross correlation computation according to the equation $$S(V_A, V_B) = \frac{\sum (V_A(x, y, z) - \overline{V}_A)(V_B(x, y, z) - \overline{V}_B)}{\sqrt{\sum (V_A(x, y, z) - \overline{V}_A)^2} \sqrt{\sum (V_B(x, y, z) - \overline{V}_B)^2}}$$

where $\overline{V}_A$ and $\overline{V}_B$ are the mean of the grayscale values of all pixels in said two volumes-of-interest and the summations are over all the voxels in both said volumes-of-interest; and selecting that second volume-of-interest that is most similar to said first volume-of-interest.

2. The method of claim 1 wherein said receiving of a selected point is effected through a graphical user interface.

3. The method of claim 1 further comprising the step of roughly aligning the two image sets.

4. The method of claim 3 wherein said rough alignment is effected through area and boundary matching.

5. A method for object correspondence identification between two image sets, comprising:

receiving a selected point in said one image set;

locating a rough matching point in said another image;

defining a first volume-of-interest around said selected point;

defining a search window around said matching point comprising a plurality of neighboring points;

for every point in said search window, defining a second volume-of-intrest;

computing the similarity/dissimilarity between each said second volume-of-interest with said first volume-of-interest by computing the sum of absolute differences over all the voxels in said volumes-of-interest in accordance with the equation $$S(V_A, V_B) = \Sigma |V_A(x,y,z) - V_B(x,y,z)|$$

and selecting that second volume-of-interest that is most similar to said first volume-of-interest.

6. A method for object correspondence identification between two image sets, comprising:

receiving a selected point in said one image set;

locating a rough matching point in said another image;

defining a first volume-of-interest around said selected point;

defining a search window around said matching point comprising a plurality of neighboring points;

for every point in said search window, defining a second volume-of-interest;

computing the similarity/dissimilarity between each said second volume-of-interest with said first volume-of-interest by thresholding followed by summation of inclusive OR:

$$I(x, y, z) = \begin{cases} 1, & V_A(x, y, z) \geq T, \quad V_B(x, y, z) \geq T \\ 1, & V_A(x, y, z) < T, \quad V_B(x, y, z) < T, \text{ and} \\ 0, & \text{else} \end{cases}$$

$$S(V_A, V_B) = \Sigma |I(x, y, z)|$$

where T is the threshold, and the summation is over all the voxels in both said volumes-of-interest; and selecting that second volume-of-interest that is most similar to said first volume-of-interest.

7. A method for object correspondence identification between two image sets, comprising:

receiving a selected point in said one image set;

locating a rough matching point in said another image;

defining a first volume-of-interest around said selected point;

defining a search window around said matching point comprising a plurality of neighboring points;

for every point in said search window, defining a second volume-of-interest;

computing the similarity/dissimilarity between each said second volume-of-interest with said first volume-of-interest by surface matching wherein the surface points of all objects within each volume-of-interest are defined as those points inside said volume-of-interest that have at least one immediate neighbor whose intensity is above a given threshold T and at least one immediate neighbor whose intensity is below T, and performing the steps of:

constructing a three-dimensional distance map for a first said volume-of-interest, $V_A$, $D_A(x, y, z)$ such that its value is the distance of the given point to the closest surface point within $V_A$; and calculating the dissimilarity between said volumes-of-interest according to the equation $$ds = \sum_{(x,y,z) \in S_B} D_A(x, y, z).$$

where $S_B$ represents the complete set of surface points in said second volume-of-interest $V_B$; and selecting that second volume-of-interest that is most similar to said first volume-of-interest.

8. The method of claim 7 further comprising the step of normalizing the coordinates of $V_A$ and VB so as to correct any difference in resolution between said image sets.

9. A program storage device readable by machine, tangibly embodying a program of instructions executable by the machine to perform the method steps for object correspondence identification between two image sets, said method steps comprising:

receiving a selected point in said one image set;

locating a rough matching point in said another image;

defining a first volume-of-interest around said selected point;

defining a search window around said matching point, comprising a plurality of neighboring points;

for every point in said search window, defining a second volume-of-interest;

computing the similarity/dissimilarity between each said second volume-of-interest with said first volume-of-interest by applying a grayscale cross correlation computation according to the equation $$S(V_A, V_B) = \frac{\sum (V_A(x, y, z) - \overline{V}_A)(V_B(x, y, z) - \overline{V}_B)}{\sqrt{\sum (V_A(x, y, z) - \overline{V}_A)^2} \sqrt{\sum (V_B(x, y, z) - \overline{V}_B)^2}}$$

where $\overline{V}_A$ and $\overline{V}_B$ are the mean of the grayscale values of all pixels in said two volumes-of-interest and the summations are over all the voxels in both said volumes-of-interest; and selecting that second volume-of-interest that is most similar to said first volume-of-interest.

10. The invention of claim 9 wherein said receiving of a selected point is effected through a graphical user interface.

11. The invention of claim 9 further comprising the step of roughly aligning the two image sets.

12. The invention of claim 11 wherein said rough alignment is effected through area and boundary matching.

13. A program storage device readable by machine, tangibly embodying a program of instructions executable by the machine to perform the method steps for object correspondence identification between two image sets, said method steps comprising:

receiving a selected point in said one image set;

locating a rough matching point in said another image;

defining a first volume-of-interest around said selected point;

defining a search window around said matching point, comprising a plurality of neighboring points;

for every point in said search window, defining a second volume-of-interest;

computing the similarity/dissimilarity between each said second volume-of-interest with said first volume-of-interest by computing the sum of absolute differences over all the voxels in said volumes-of-interest in accordance with the equation $$S(V_A, V_B) = \Sigma |V_A(x, y, z) - V_B(x, y, z)|$$

and selecting that second volume-of-interest that is most similar to said first volume-of-interest.

14. A program storage device readable by machine, tangibly embodying a program of instructions executable by the machine to perform the method steps for object correspondence identification between two image sets, said method steps comprising:

receiving a selected point in said one image set;

locating a rough matching point in said another image;

defining a first volume-of-interest around said selected point;

defining a search window around said matching point, comprising a plurality of neighboring points;

for every point in said search window, defining a second volume-of-interest;

computing the similarity/dissimilarity between each said second volume-of-interest with said first volume-of-interest by thresholding followed by summation of inclusive OR:

$$I(x, y, z) = \begin{cases} 1, & V_A(x, y, z) \geq T, \quad V_B(x, y, z) \geq T \\ 1, & V_A(x, y, z) < T, \quad V_B(x, y, z) < T, \text{ and} \\ 0, & \text{else} \end{cases}$$

$$S(V_A, V_B) = \Sigma |I(x, y, z)|$$

where T is the threshold, and the summation is over all the voxels in both said volume-of-interest; and selecting that second volume-of-interest that is most similar to said first volume-of-interest.

15. A program storage device readable by machine, tangibly embodying a program of instructions executable by the machine to perform the method steps for object correspondence identification between two image sets, said method steps comprising:

receiving a selected point in said one image set;

locating a rough matching point in said another image;

defining a first volume-of-interest around said selected point;

defining a search window around said matching point, comprising a plurality of neighboring points;

for every point in said search window, defining a second volume-of-interest;

computing the similarity/dissimilarity between each said second volume-of-interest with said first volume-of-interest by surface matching wherein the surface points of all objects within each volume-of-interest are defined as those points inside said volume-of-interest that have at least one immediate neighbor whose intensity is above a given threshold T and at least one immediate neighbor whose intensity is below T, and performing the steps of;

constructing a three-dimensional distance map for a first said volume-of-interest, $V_A$, $D_A(x, y, z)$ such that its value is the distance of the given point to the closest surface point within $V_A$; and calculating the dissimilarity between said volumes-of-interest according to the equation $$ds = \sum_{(x,y,z) \in s_B} D_A(x, y, z).$$

where $S_B$ represents the complete set of surface points in said second volume-of-interest $V_B$; and selecting that second volume-of-interest that is most similar to said first volume-of-interest.

16. The method of claim 15 further comprising the step of normalizing the coordinates of $V_A$ and VB so as to correct any difference in resolution between said image sets.

* * * * *